(No Model.)  S. AMBLER.  5 Sheets—Sheet 1.
MACHINE FOR TWISTING OR DOUBLING YARN No. 544,203.  Patented Aug. 6, 1895.

(No Model.)  5 Sheets—Sheet 2.
S. AMBLER.
MACHINE FOR TWISTING OR DOUBLING YARN.
No. 544,203.  Patented Aug. 6, 1895.
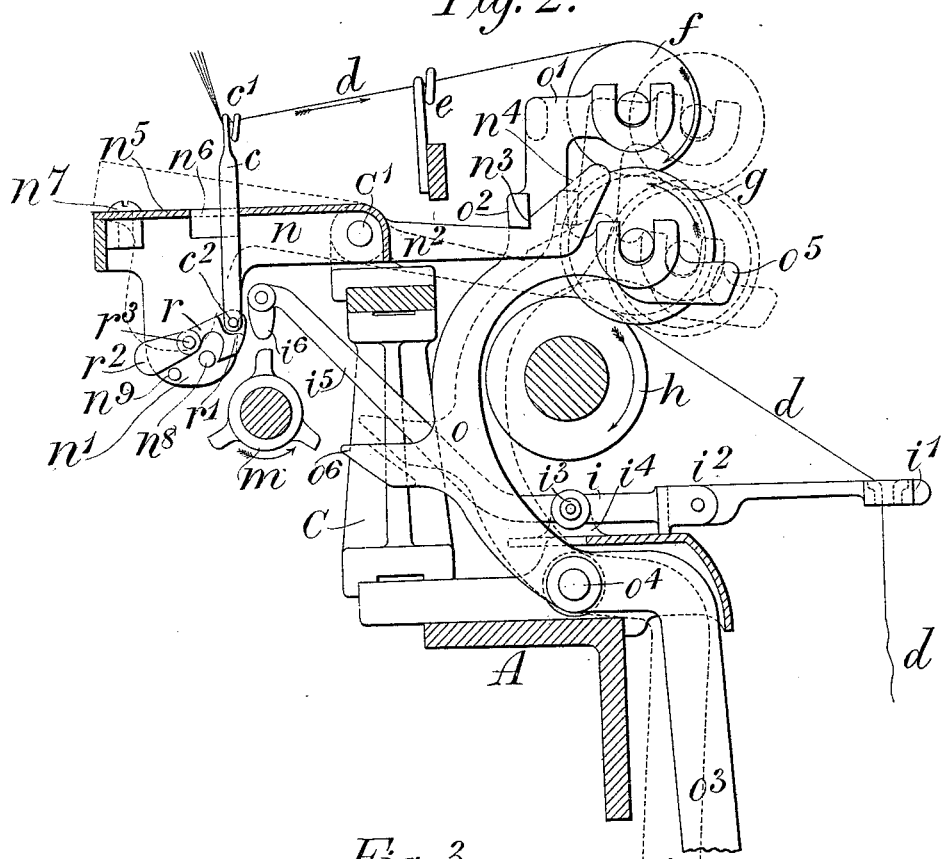
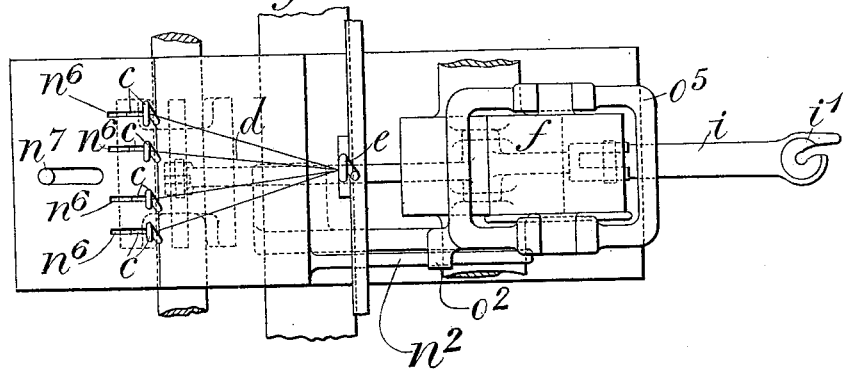

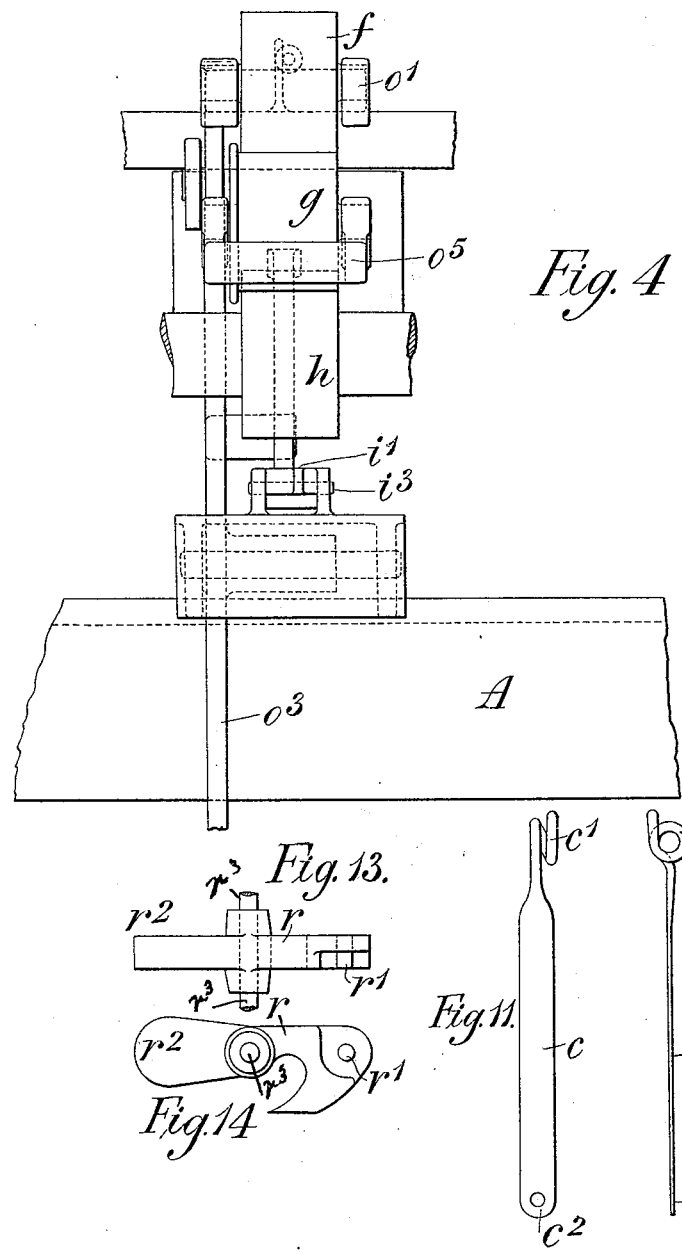

(No Model.) 5 Sheets—Sheet 4.
S. AMBLER.
MACHINE FOR TWISTING OR DOUBLING YARN.

No. 544,203. Patented Aug. 6, 1895.

(No Model.) 5 Sheets—Sheet 5.
S. AMBLER.
MACHINE FOR TWISTING OR DOUBLING YARN.
No. 544,203. Patented Aug. 6, 1895.
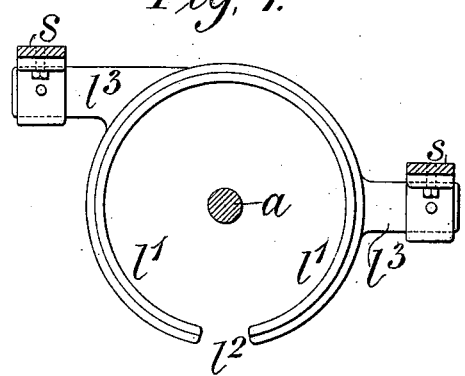
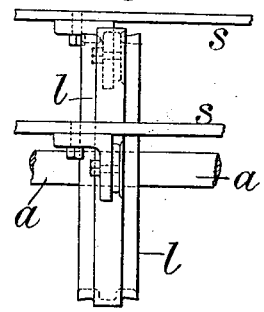
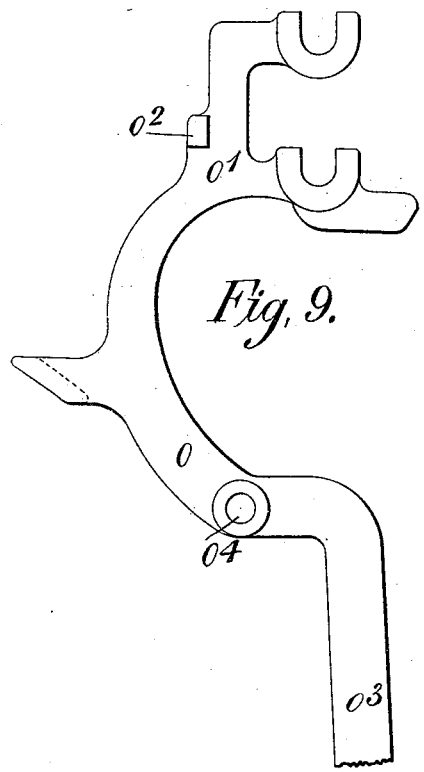
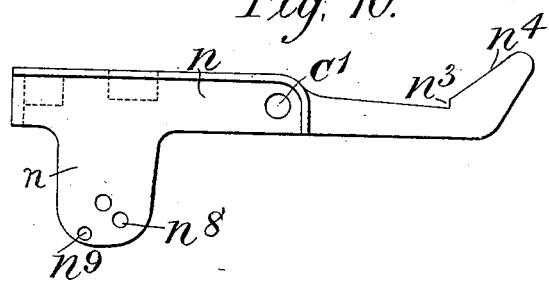

UNITED STATES PATENT OFFICE.

SMITH AMBLER, OF KEIGHLEY, ENGLAND, ASSIGNOR TO PRINCE SMITH & SON, OF SAME PLACE.

MACHINE FOR TWISTING OR DOUBLING YARN.

SPECIFICATION forming part of Letters Patent No. 544,203, dated August 6, 1895.

Application filed August 9, 1892. Serial No. 442,549. (No model.)

*To all whom it may concern:*

Be it known that I, SMITH AMBLER, draftsman, of Burlington Shed, Keighley, in the county of York, England, have invented new and useful Improvements in Machines for Twisting or Doubling Yarn, of which the following is a specification.

The present invention is designed to simplify and improve the construction, arrangement, or combination and use of parts of apparatus employed in winding, twisting, or doubling yarn or thread to prevent the formation of imperfect work, such as is known as "singles" or "single" yarn, "double knots," or other defective results, and to facilitate piecing up.

Figure 1:
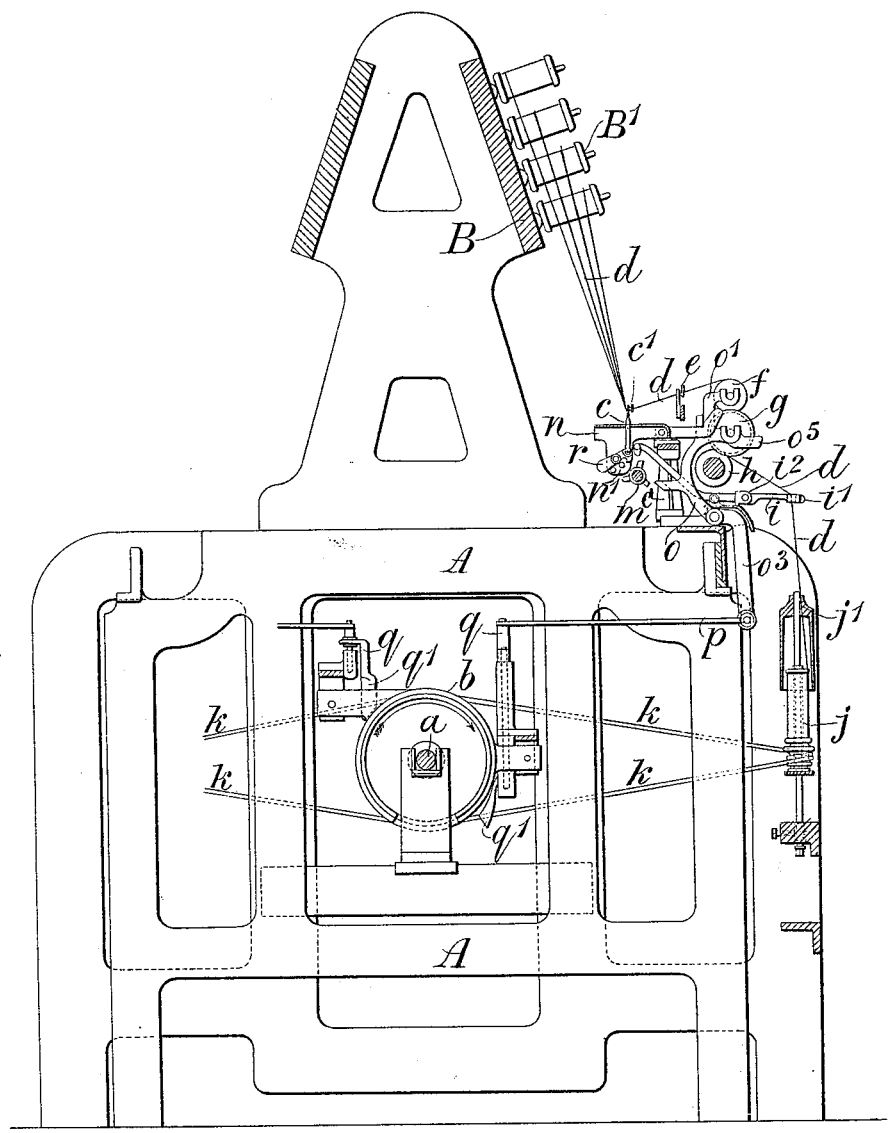
Figure 5:
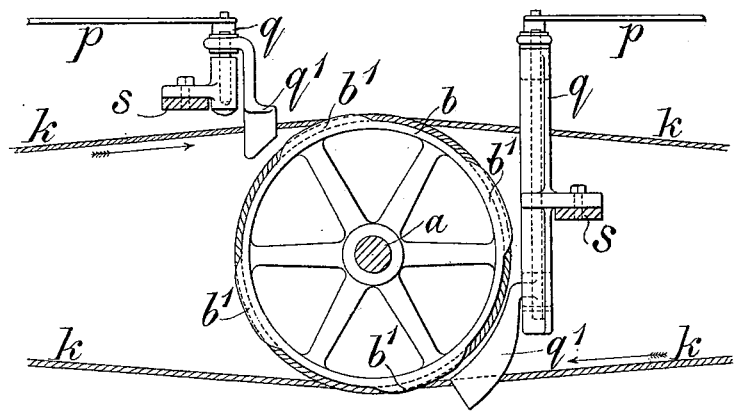
Figure 6:
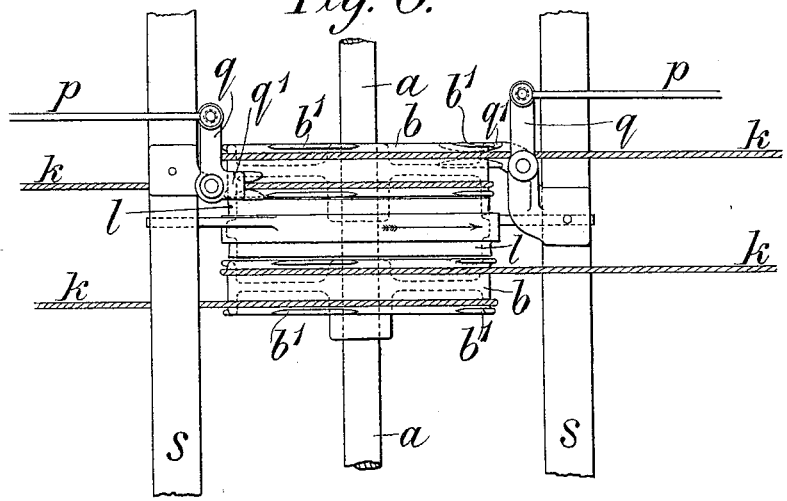

In the drawings, Figure 1 is a sectional side view of the machine. Fig. 2 is an enlarged view of parts of the same, showing the feed-rollers and parts co-operating with same. Fig. 3 is a plan view of Fig. 2. Fig. 4 is a front view of Fig. 2. Fig. 5 is a side view, and Fig. 6 is a plan view, of the driving-bands and the pulleys driving them and the side friction-surface $l$, which replaces the ordinary loose pulley. Fig. 7 is a side view, and Fig. 8 is a front view, of this friction-surface $l$. Fig. 9 is a side view of support $o$ for the upper rollers $f$ and $g$. Fig. 10 is a side view of a support for one of the levers $n$. Fig. 11 is a side view, and Fig. 12 is a front view, of one of the detectors separately to an enlarged scale. Fig. 13 shows by a top view, and Fig. 14 by a side view, one of the weighted rock-arms $r$, onto the pin $r'$ of which one of the detectors is hinged.

According to my present invention, as arranged in one form shown by the accompanying drawings, the main framing A is adapted to carry the supports B for the series of bobbins, cops, or thread-holders B'; and the machine, for convenience, is duplicated, (although in the drawings, Fig. 1, the parts to the left hand of the machine are not shown,) and both sets of parts are driven from a central driving-shaft $a$ and driving-pulley $b$. The yarn or thread passes from these bobbins, cops, or holders, of which four are shown, to a series of detectors, one detector $c$ to each yarn or thread $d$, and when all is in work, and tension is on the particular thread $d$, the detector $c$ allotted to it is kept raised and idle. Thence the thread passes on through a guide $e$ to and partly around one and then another of a pair (or other number) of friction-driven rollers $f$ and $g$, and in operation the lower top friction-roller $g$ presses on the feed-roller $h$, and the thread between them is drawn and fed forward to and passes through the eye $i'$ of a jointed lever $i$, ($i^2$ being a joint therein,) hinged on a center $i^3$, carried by a bracket or support $i^4$ from the framing A, so that its end $i^5$ opposite to the thread-eye $i'$, which carries a small hinged block $i^6$ or obstacle, may be capable of swinging this block $i^6$ into and out of engagement with parts to be described. The combined yarns or threads $d$ thence pass to the caps or tubes or ring spindles or fliers, (here shown as a cap $j'$ and spindle $j$,) so as to be wound, doubled, or twisted, and these latter parts are driven by one of a series of bands $k$ from the driving-pulley $b$, on which are formed rises or projections $b'$, which act in conjunction with the fingers $q'$ to throw off the driving-band $k$ from such pulley $b$ onto a brake-ring $l$, preferably formed as a part circle $l'$, with a gap $l^2$ in the continuity of its periphery to admit of easier removal and replacement without disturbance of the driving-shaft $a$, and this ring or part circle $l'$ acts as a frictional brake, it being stationary, to stop the band $k$ and thereby the rotation of the spindle or the like receiver for the combined thread.

Adjacent to the block $i^6$ on the swing-arm $i$, referred to, is a rotating cam or striker $m$, which on occasion strikes this block $i^6$ when it becomes interposed in the path of its rotation, and this will take place should the thread fail to keep down or in place the eye end $i'$ of the arm $i$ and so let the opposite end $i^5$ tilt the block $i^6$ into contact with the striker $m$. Then the block $i^6$ being struck, it moves, and in moving out of the course of the cam it presses back or away one part $n'$ of a lever $n$, pivoted at C' on a bracket or support C from the framing A, the other part $n^2$ of this lever $n$ being formed with a snick or notch $n^3$ and an incline $n^4$, the function of which notch $n^3$ is to engage a projection $o^2$ on the lever $o$ and hold up or in operative position the hinged lever $o$, which in one portion $o'$ carries the bearings for the journals of the top rollers $f$ and $g$, so as to be frictionally driven by the feed-roller $h$ or when such projection is released to allow those rollers $f$ and $g$ with it to tilt out of driving contact therewith, as indicated by the dotted lines, Fig. 2, and so stay the supply of thread. The incline $n^4$ serves to aid the notch $n^3$ and projection $o^2$ to correctly engage. As this lever $o$ tilts on its center $o^4$ its opposite end $o^3$ draws or moves a rod $p$, connected to it and to a cranked arm $q$, provided with fingers $q'$, which shifts the driving-band $k$ to one side of its direct operative path and into the path of the projections or snails $b'$ on the driving-pulley $b$, and by these it is, as already mentioned, thrown around the brake-ring $l$ and stopped.

The detectors $c$ on the threads $d$, between the supply-holders $B'$ and the feed-roller $h$, are preferably formed as thin strips, having a slightly-formed twist or coil $c'$ (shown separately and to a larger scale, Figs. 11 and 12) to receive the thread, and thereby hang suspended on it as long as it is intact, while at their lower ends these strips $c$ are formed with holes $c^2$, by which they are passed onto pins $r'$, projecting from a series of weighted rock-arms $r$, centered at $r^3$ on a fin or projection $n'$ from the catch or notch lever $n$, and these detector-blades I prefer to guide in slots $n^6$, formed in a plate $n^5$, adapted for convenience of adjustment to slide on the upper part of this lever $n$ and be secured by screwing at $n^7$. These weighted rock-arms $r$ and the detectors $c$, attached, when in their dropped position rest on a rod $n^8$ across the balance end $n'$ of the notch-lever $n$, and this rod $n^8$ serves for the block $i^6$ to press on. Another rod $n^9$ serves to determine the extent of movement upward of the detectors $c$ by engaging the balance ends $r^2$ of the rock-arms $r$.

The brake-surfaces or part rings $l$, I prefer to support adjustably by means of lugs, arms, or projections $l^3$, oppositely disposed and bolted or otherwise secured to bars or supports $s$, which may be secured lengthwise of the machine conveniently for the purpose.

Upon the front of the lever $o$, which carries the top rollers $f$ and $g$, I apply a handle part $o^5$, so that the operator may reinstate the parts as soon as any default has been made good, and by lifting that lever end $o'$ engage the trigger parts $o^2$ and $n^3$ by causing the catch $o^2$ to enter the notch $n^3$, at the same time setting the driving-band $k$ in operative position, the tension of the respective threads depressing the eye-levers $i'$ and lifting the detectors $c$ free of the striker $m$. Rearwardly the said top-roller lever $o'$ is formed with a projecting or stop part $o^6$, adapted to determine the extent of movement of the end $i^5$ of the lever $i$, on which the block $i^6$ is hung, and in certain movements carry it with it.

I have mainly described the invention with reference to one set only of a number of co-operative parts, as thereby simplicity of description is promoted, the other parts being either mainly as usual or duplications of those described. The effect of a thread breakage in one or other of the bobbins will be as follows: The yarn-detector, which has hitherto been kept up by the tension of the thread, is allowed by its own gravity to fall into such a position as to cause either itself or its rock-arm $r$ to come in contact with the wiper $m$, which forces the detector backward, thereby turning the lever $n$ about its center $c'$, thus releasing the projection $O^2$ of the lever $O$ from the notch $n^2$ in the lever $n$. The lever $o$ in turn revolves on its center $o'$, breaks the contact between the rollers $g$ and $h$, thereby stopping the delivery of yarn, and by means of the connecting-wire $p$ transmits the motion to the arm $q$, whose fingers or guides $q'$ shift the band from the driving-pully $b$ to the brake ring or pulley $l$. Thus the stoppage of the spindle is identical with the stoppage of the delivery of the yarn.

In the event of a breakage of the yarn between the rollers and spindles, the detector-lever $i$ (no longer kept down by the tension of the thread) falls into its normal position.

In restarting the mechanism after a breakage, the lever $o$ is pushed back into its position, and simultaneously with this the guide or band-fork $q'$ is by means of the connecting-wire $p$ attached to the lower leg of lever $o$, turned about on its center, thereby forcing the band into the path of the snail $b'$, which snail in its circular motion completes the operation by forcing the band $k$ into its proper position on the band-pulley $b$.

Various modifications in details or number of individual parts or their relative disposition to adapt the frame to the particular operation to be performed or the quality of the work may be made without departing from the essential features of novelty of the invention.

Having now particularly described and ascertained the nature of my said invention and in what manner the same is to be performed, I declare that what I claim is—

1. In a machine for twisting or doubling yarn, the combination of a series of detectors held up by threads, a driving shaft, band pulleys thereon provided with projecting snails, brake rings adjacent to the band pulleys, twisting spindles, driving bands connecting the pulleys and spindles, band forks, and mechanism connecting the detectors and band forks to ship the belt on the breaking of a thread, substantially as described.

2. In a machine for twisting or doubling yarn, the combination of the rollers, the lever frame supporting the same, the series of detectors $c$ adapted to be held up by the tension of the threads, the arm $i$ having a joint $i^2$ and an eye through which the threads may pass, the block $i^6$ on said arm, rotating striker $m$ adapted to strike said block, lever O, wire $p$ connected thereto, a fork actuated by said wire, pulleys provided with snails $b'$, twisting spindles and driving bands connecting the twisting spindles and driving pulleys, substantially as described.

In testimony whereof I, the said SMITH AMBLER, have hereunto set my hand this 25th day of July, 1892.

SMITH AMBLER.

Witnesses:
C. S. HALLIDAY,
JOHN STOPHERD.